United States Patent [19]

Hosoya

[11] Patent Number: 5,893,346
[45] Date of Patent: Apr. 13, 1999

[54] ENGINE BALANCE SHAFT

[75] Inventor: Takahisa Hosoya, Iwata, Japan

[73] Assignee: Yamaha Hatsudoki Kabushiki Kaisha, Iwata, Japan

[21] Appl. No.: 08/936,430

[22] Filed: Sep. 24, 1997

[30] Foreign Application Priority Data

Sep. 24, 1996 [JP] Japan ................................. 8-251317

[51] Int. Cl.$^6$ ................................................. F02B 75/06
[52] U.S. Cl. ............................................ 123/192.2; 74/603
[58] Field of Search .......................... 123/192.2; 74/603, 74/604

[56] References Cited

U.S. PATENT DOCUMENTS

| | | |
|---|---|---|
| 4,465,029 | 8/1984 | Matsumoto ........................ 123/192.2 |
| 4,617,885 | 10/1986 | Oshiro et al. ..................... 123/192.2 |
| 4,703,725 | 11/1987 | Weertman ........................ 123/192.2 |
| 4,856,486 | 8/1989 | Mori et al. ....................... 123/192.2 |
| 5,044,333 | 9/1991 | Fuchigami et al. ............... 123/192.2 |
| 5,174,257 | 12/1992 | Ozawa ............................. 123/192.2 |
| 5,401,199 | 3/1995 | Shibata ................................. 440/52 |
| 5,461,940 | 10/1995 | Morita ............................. 123/192.2 |
| 5,537,968 | 7/1996 | Takahashi ........................ 123/192.2 |

Primary Examiner—Noah P. Kamen
Attorney, Agent, or Firm—Knobbe, Martens, Olson & Bear LLP

[57] ABSTRACT

A balance shaft mounting arrangement for a four cycle overhead camshaft internal combustion engine wherein the balance shaft is driven from the crankshaft and is disposed within the crankcase chamber and is disposed below the axis of rotation of the crankshaft. The balance shaft is driven from an end of the crankshaft and is journalled, at least in part, by a detachable crankshaft journaling member.

6 Claims, 4 Drawing Sheets

ENGINE BALANCE SHAFT

BACKGROUND OF THE INVENTION

This invention relates to a balancer shaft for a four cycle engine and more particularly to an improved mounting structure for such a shaft.

It is well known that reciprocating engines generate certain forces which should be balanced to provide smooth running. One way in which these forces are balanced is by providing a balancing shaft having eccentric masses which is driven by the crankshaft and which rotates at the same speed as the crankshaft but in an opposite direction. Although such balancing shafts have high utility and provide smooth running engines, the addition of a further shaft to the engine crankshaft complicates and enlarges the overall construction of the engine.

Conventionally it has been the practice to locate the balance shafts on the side of the engine crankshaft so as to avoid any increase in height of the overall engine. It is undesirable for a number of reasons to increase the height of the engine. An increase in height not only raises the center of gravity in the overall vehicle but also precludes the use of low hood lines which are important for aerodynamic reasons.

When the balance shaft is employed in a four cycle internal combustion engine additional problems arise. For instance, if the balancer shaft is located at a distance away from the crankshaft, the intermediate area, that area between the crankshaft and the balance shaft, will be subject to the vibrations caused by the imbalance. The vibrations are then translated into other components causing both vibrations and noise, both of which are undesirable. Another problem arises when the balance shaft is located in the oil collection region of the oil pan. When the rotating balance shaft contacts the oil, the oil will froth which could potentially cause damage to the oil pump.

It is therefore a principal object of this invention to provide an improved balance shaft mounting arrangement for an internal combustion engine.

It is a further object of this invention to provide a balance shaft mounting arrangement that does not increase the overall height of the engine.

It is yet a further object to this invention to provide an improved balance shaft arrangement for a four cycle engine wherein the balance shaft rotates within the crankcase chamber and is positioned closely adjacent to the crankshaft.

SUMMARY OF THE INVENTION

This invention is adapted to be embodied in an overhead camshaft internal combustion engine comprised of a cylinder block defining at least one cylinder bore, a cylinder head assembly affixed to the cylinder block and closing one end of the cylinder bore to form a combustion chamber. The combustion chamber is defined by a piston reciprocating in the cylinder block. The cylinder head assembly comprises a main cylinder head member journaling a camshaft for rotation therein for operating at least one valve associated with the combustion chamber. A crankcase housing cover is attached to the cylinder block on a side opposite the cylinder block defining an oil collection region on a side of the housing cover opposite the cylinder head. A crankshaft is located within the crankcase housing cover rotatably journaled relative to the cylinder block at the end of the cylinder bore opposite the cylinder head and driven by the piston. The crankshaft is journaled between the cylinder block and a crankcase assembly located within the crankcase housing cover. The crankcase assembly includes at least one detachable crankshaft journaling member providing at least in part a journal for journaling a balance shaft for rotation about an axis parallel to the axes of rotation of said crankshaft and said camshaft. A first flexible transmitter for driving the balance shaft from the crankshaft and a second flexible transmitter for driving the camshaft from the crankshaft are also provided.

DETAILED DESCRIPTION OF THE PREFERRED EMBODIMENTS OF THE INVENTION

Figure 1:
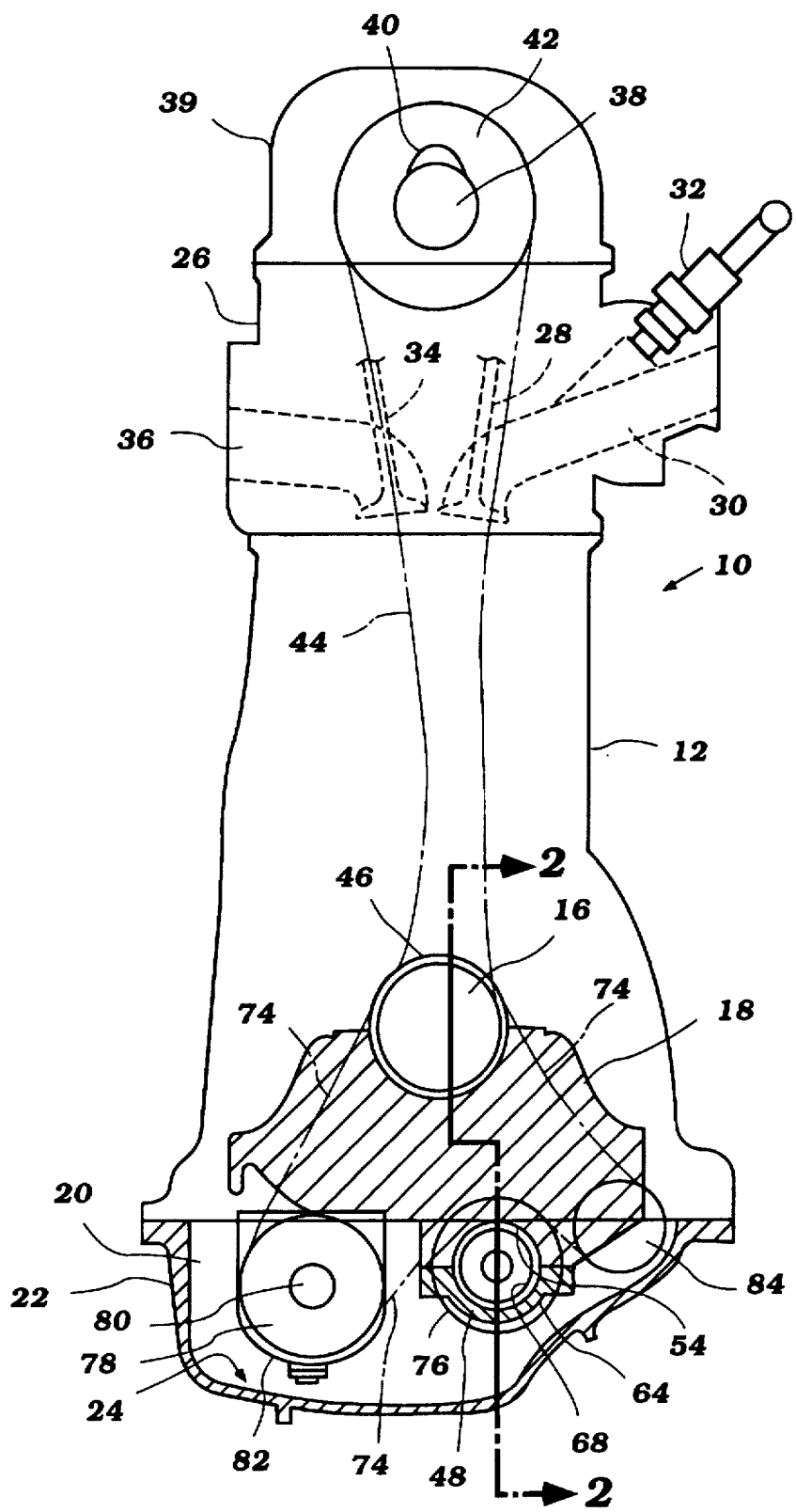
FIG. 1 is a side view of an engine, with portions broken away and other portions shown in section.

A five cylinder, inline, overhead camshaft, internal combustion engine constructed in accordance with this embodiment of the invention is identified generally by the reference numeral 10. Although the invention is described in conjunction with a five cylinder inline engine, it should be readily apparent to those skilled in the art that certain facets of the invention can be employed in conjunction with engines having other numbers of cylinders and other cylinder configurations. The invention, however, has particular utility in four cycle inline engines and particularly those intended for use in automotive applications.

Figure 2:
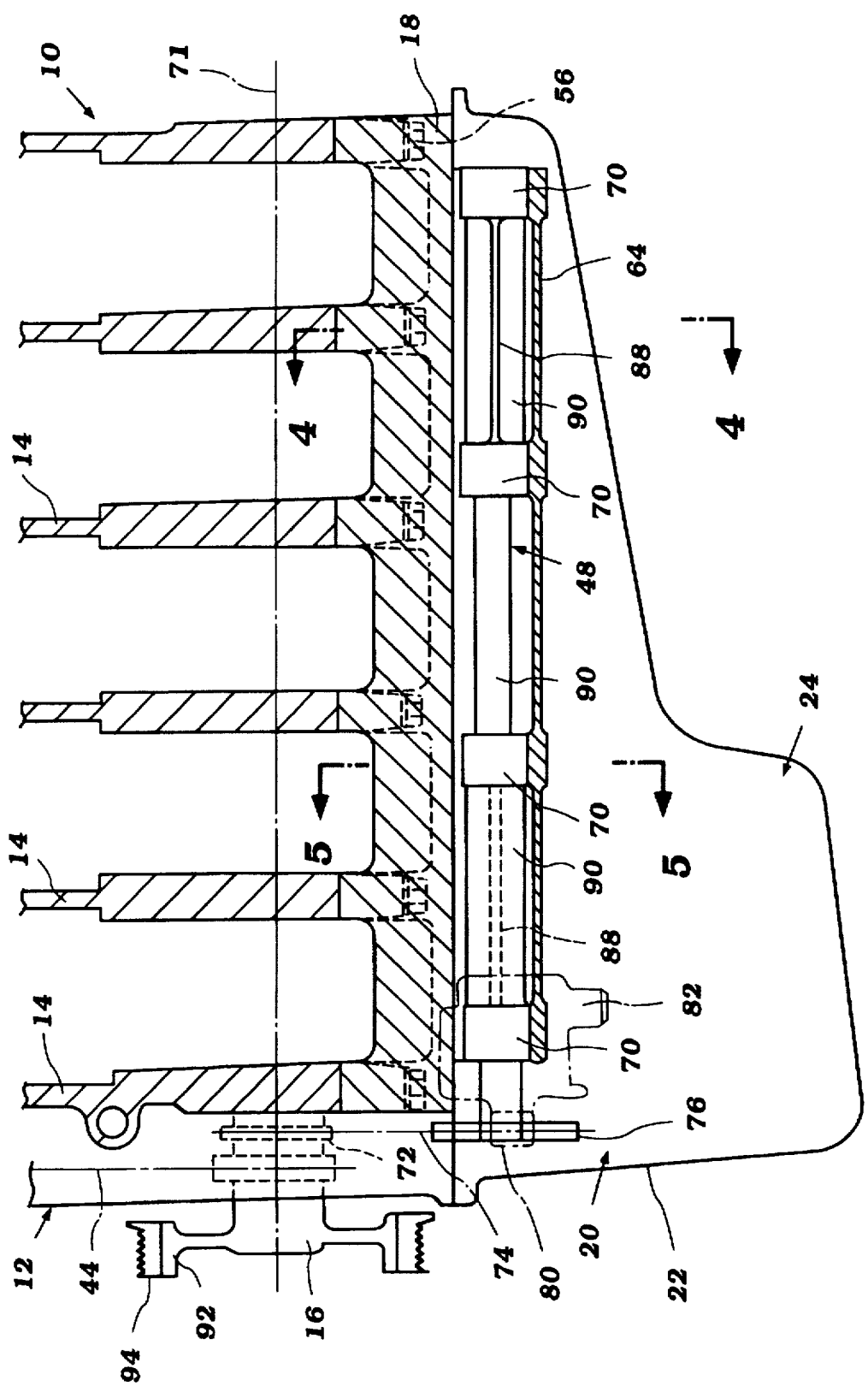
FIG. 2 is a partial cross-sectional view of the engine taken generally along line 2—2 of FIG. 1.

The engine 10 is comprised of a cylinder block 12 which may be formed of a light weight material such as cast aluminum alloy and which has cylinder liners (not shown) that define cylinder bores 14 as shown best in FIG. 1 and FIG. 2. The cylinder bore axes define a plane that is inclined rewardly from the vertical. The pistons reciprocate in each of the cylinder bores 14 and are connected to the upper ends of connecting rods by piston pins. The lower ends of the connecting rods are journaled on respective throws of a crankshaft 16. The crankshaft 16 has bearing portions that are journaled between the cylinder block 12 and the detachable crankcase journaling member 18. The member 18 journals the crankshaft 16 between the respective throws. The detachable member 18 lies completely within the crankcase chamber 20 which is defined by the oil pan 22 and fastened to the cylinder block 12 with mechanical fasteners that are known in the art. The oil pan 22 collects the oil that is used to lubricate the crankshaft 16 and the oil collects in the bottom of the oil pan 22 in an oil collection region 24.

A cylinder head is affixed to the cylinder block 12 in a known manner and has individual recesses (not shown) that cooperate with the cylinder bores 14 and the piston to define the engine combustion chambers. At least one intake valve 28 is slidably supported in the cylinder head 26 and cooperates with an intake passage 30 also formed in the cylinder head 26 for delivering a fuel air charge to the combustion chamber.

The fuel is supplied to the intake passage 30 by a fuel injector 32 as best illustrated in FIG. 1. The fuel injectors 32 are supported in the cylinder head 26 and discharge fuel supplied from a fuel rail into the cylinder head intake passages 30 in proximity to the intake valves 28. The fuel injection system is controlled by any suitable arrangement.

At least one exhaust valve 34 is supported in the cylinder head 26 in a known manner so as to control the flow of exhaust gases from the combustion chamber into cylinder head exhaust passage 36. The exhaust passages 36 cooperate with an exhaust manifold and an exhaust system, all not shown, for discharging the exhaust gases from the engine 10 to the atmosphere.

A camshaft 38 is located and journaled in the cylinder head 26 and which is within an area defined by the cylinder head cover 39. The camshaft 38 includes at least one cam 40 which is used to operate the intake valve 28 and the exhaust valve 34. The camshaft 38 of the preferred embodiment as shown is a single overhead cam design. The present invention, however, can be used with a wide variety of camshaft configurations including a dual overhead camshaft system.

A sprocket 42 is mounted to an end of the camshaft 38. A chain 44 connects the sprocket to a crankshaft sprocket 46 mounted on a similar end of the crankshaft 16. The crankshaft 16 drives the crankshaft sprocket 46 which in turn drives the camshaft sprocket 42 with the chain 44. The drive system 10 may incorporate chain tensioners or idler pulleys to provide the required tension in the chain. Although the preferred embodiment illustrates a system that drives the camshaft directly from the crankshaft it is understood that the present invention can be configured with other cam drive systems as known in the art. Moreover, although the preferred embodiment utilizes chains to drive the shafts it is understood that any flexible transmitter or gear known in the art will suffice.

The engine 10 as thus far described may be considered to be conventional and, for that reason, components which are conventional will not be described further inasmuch as their construction and operation will be known to those skilled in the art.

Figure 3:
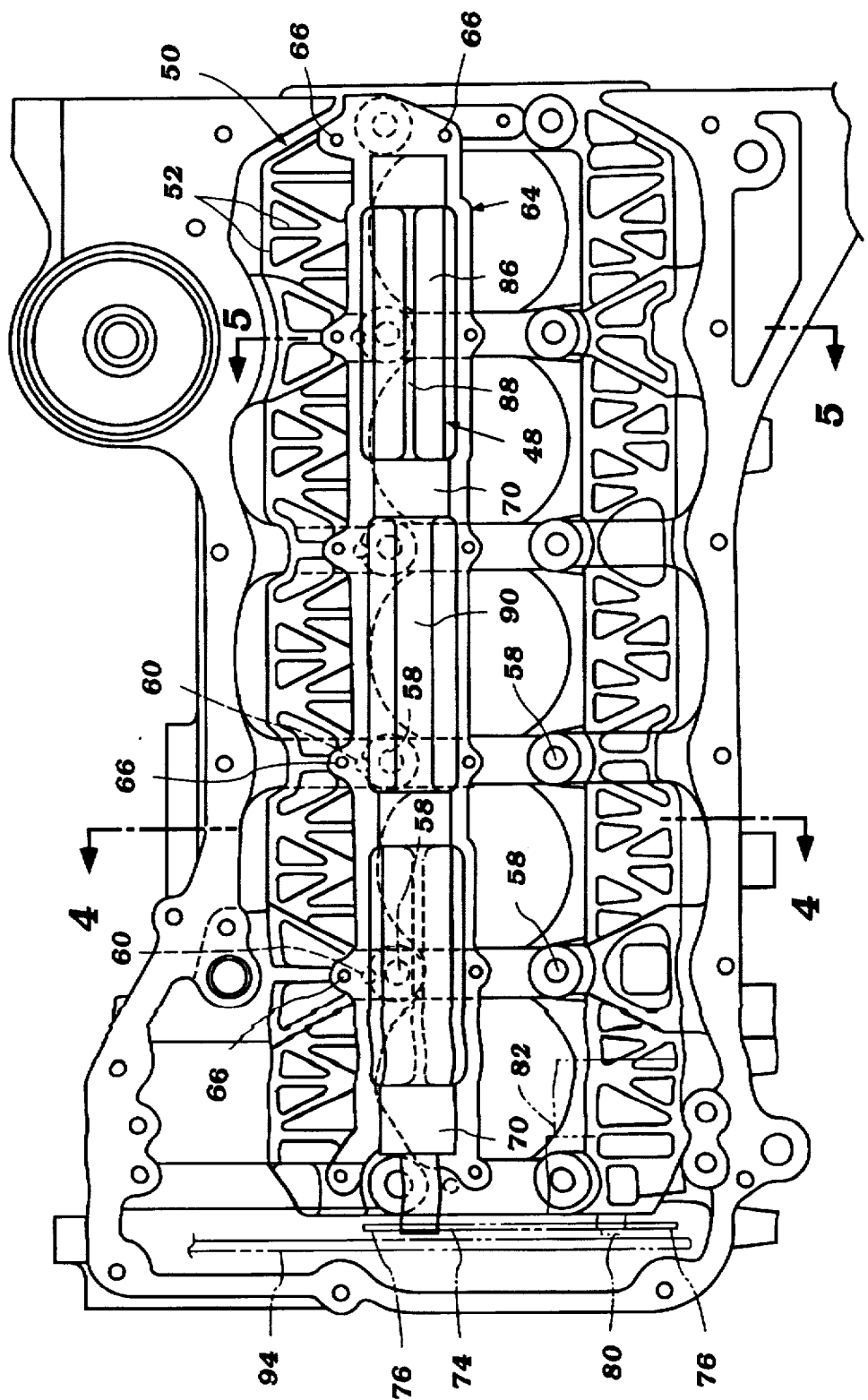
FIG. 3 is a bottom view of the engine of FIG. 1.
Figure 4:
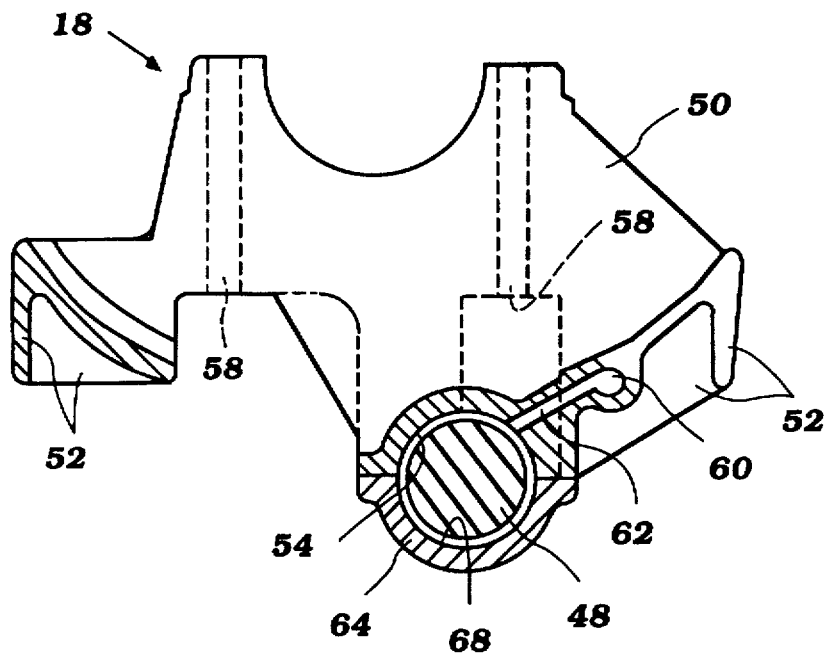
FIG. 4 is a partial cross-sectional view of the engine taken generally along line 4—4 of FIG. 3.
Figure 5:
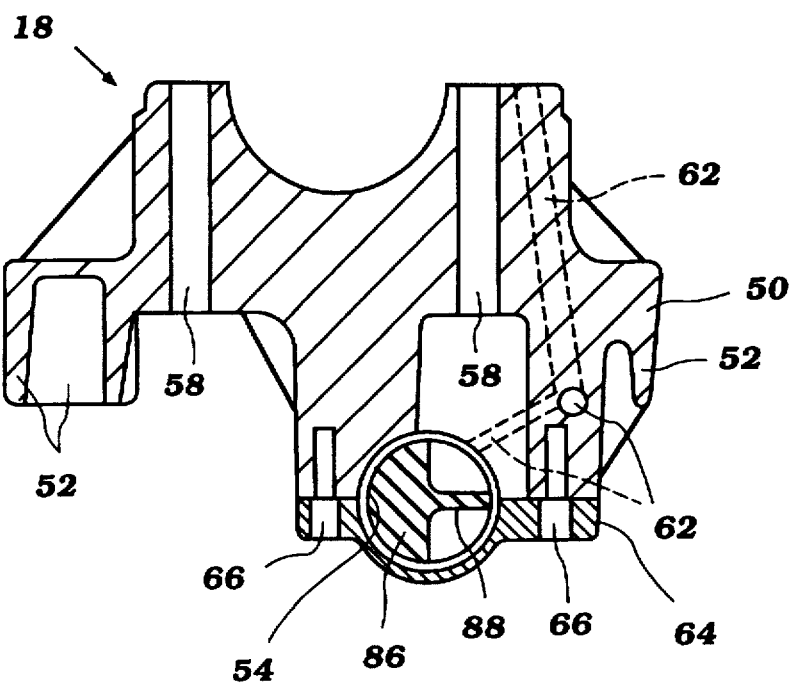
FIG. 5 is a partial cross-sectional view of the engine taken generally along line 5—5 of FIG. 3.

A balancer shaft, indicated generally by the reference numeral 48, is rotatably journaled partially by the detachable member 18. As is best illustrated in FIG. 3 the detachable member 18 includes a mounting portion 50 for partially journaling the balance shaft 48. The mounting portion contains a plurality of reinforcements ribs or webs referred to by reference numeral 52. Between the webs 52 lies the journaling portions 54 of the detachable member 18 as best illustrated in FIG. 4 and FIG. 5. The journaling portions 54 are typically fitted with a bearing arrangement as known in the art.

The detachable member 18 is mounted to the cylinder block 12 with mechanical fasteners 56 as illustrated in FIG. 2. The mechanical fasteners 56 are inserted through the access holes 58 shown in FIG. 2, FIG. 4 and FIG. 5 and attached to the cylinder block 12.

An oil lubrication system for the balance shaft is also included in the member 18. The lubrication system is best illustrated in FIG. 3, FIG. 4 and FIG. 5. The lubrication system consists of oil ports 60 and oil galleries 62 which supply a source of lubrication to the balance shaft 48. The oil for the lubrication system is supplied to ports 60 and galleries 62 in a manner that is known in the art.

The balancer shaft 48 rotatable journal is completed with a mounting plate generally referenced as 64. The mounting plate 64 is best illustrated in FIG. 3, FIG. 4 and FIG. 5. The plate 64 is attached to the bottom of the detachable member 18 with mechanical fasteners as is known in the art. In the present embodiment the mechanical fasteners are inserted through the access holes 66 and then secured to the detachable member 18. The mounting plate 64 includes a plurality of journaling surfaces 68 in which the balance shaft is rotatably journalled. These journaling surfaces 68 correspond with mounting portions 70 on the balance shaft to provide support for the rotating balance shaft 48. The surfaces 68 and 54 are provided with bearing means as known in the art to provide for the rotation of the balance shaft 48.

The balancer shaft 48 is located in the crankcase chamber 20 as best illustrated in FIG. 1 and FIG. 2. In the preferred embodiment, the balance shaft 48 rotates about an axis that is parallel to that of the crankshaft 16. The axis of rotation of the balance shaft 48 is preferably located beneath the axis of rotation of the crankshaft 71 to provide for communication of the crankshaft lubrication system. The lubrication is thus easily guided into the galleries and ports to lubricate the balance shaft. The oil then drains from the balance shaft 48 into the oil collection region 24 of the oil pan 22. The balance shaft 48 is mounted above the oil collection region in order to prevent frothing of the oil that would occur if the rotating shaft was located in the oil collection region 24.

The balancer shaft 48 is driven from the crankshaft 16 so as to rotate at the same speed as the crankshaft. This drive includes a driving sprocket 72 that is affixed to the end of a crankshaft 16 which in turn drives a chain 74. The chain 74 drives the balance shaft sprocket 76 which in turn rotates the balance shaft 48. The chain 74 also drives the oil pump input sprocket 78 which in turn rotates the oil pump input shaft 80 thereby powering the oil pump 82. The chain 74 is also entrained over an idler pulley 84. Chain tensioning means as known in the art could also be employed if desired to attain the requisite tension in the chain 74.

The balance shaft 48 has formed integrally with it two eccentric masses. As is best illustrated in FIG. 2 and FIG. 3 these masses include a head 86 and a leg portion 88. Further, an intermediate region 90 separates the eccentric masses on the balance shaft 48. As is well known, the rotation of the eccentric masses will cause the balancing of certain forces on the engine 10.

The engine 10 is also provided with a number of accessories which are also driven by the crankshaft 16. These accessories are driven by a pulley 92 mounted on the end of the crankshaft 16 illustrated in FIG. 2. The pulley in turn drives an auxiliary belt 94. The belt can be of the serpentine type and can be used to drive a number of engine accessories including but not limited to a power steering pump, a water pump and an alternator.

Of course, the foregoing description is that of preferred embodiments of the invention, and various changes and modifications may be made without departing from the spirit and scope of the invention, as defined by the appended claims.

What is claimed is:

1. An overhead camshaft internal combustion engine comprised of a cylinder block defining at least one cylinder bore, a cylinder head assembly affixed to said cylinder block and closing one end of said cylinder bore to form a combustion chamber therein along with a piston reciprocating in said at least one cylinder bore, said cylinder head assembly comprising a main cylinder head member journaling a camshaft for rotation therein for operating at least one valve associated with said combustion chamber, a crankcase housing cover attached to said cylinder block on a side opposite said cylinder block defining an oil collection region on a side of said housing cover opposite said cylinder head, a crankshaft located within said crankcase housing cover, said crankshaft being rotatably journaled relative to said cylinder block at the end of said cylinder bore opposite said cylinder head between bearing surfaces formed by said cylinder block and a main bearing member detachably connected to said cylinder block, said crankshaft being driven by said piston, a balance shaft journaled for rotation about an axis parallel to the axes of rotation of said crankshaft and said camshaft within said crankcase housing cover between at least one bearing surface formed by said main bearing member and a balance shaft bearing member detachably connected to said main bearing member, a first drive for driving said balance shaft from said crankshaft, and a second drive for driving said camshaft from said crankshaft.

2. The overhead camshaft internal combustion engine of claim 1 wherein said first drive includes drive means mounted on one end of said balance shaft and driven by drive means mounted on said crankshaft at the end of said crankshaft corresponding to said one end of said balance shaft.

3. The overhead camshaft internal combustion engine of claim 1 wherein a balance shaft axis defining the axis of rotation of said balance shaft is below a crankshaft axis defining the axis of rotation of said crankshaft and said balance shaft axis is located above said oil collection region of said crankcase housing cover.

4. The overhead camshaft internal combustion engine of claim 1 wherein said main bearing member further forms an oil gallery receiving oil from an engine lubricating system and for delivering the oil to a bearing for said balance shaft.

5. The overhead camshaft internal combustion engine of claim 1, wherein at least one of the first and second drives comprises a flexible transmitter.

6. The overhead camshaft internal combustion engine of claim 5, wherein both of the first and second drives comprise flexible transmitters.

* * * * *